Oct. 22, 1929.　　　H. H. BOETTCHER　　　1,732,830
BEET THINNING MACHINE
Filed Feb. 7, 1928　　　4 Sheets-Sheet 1
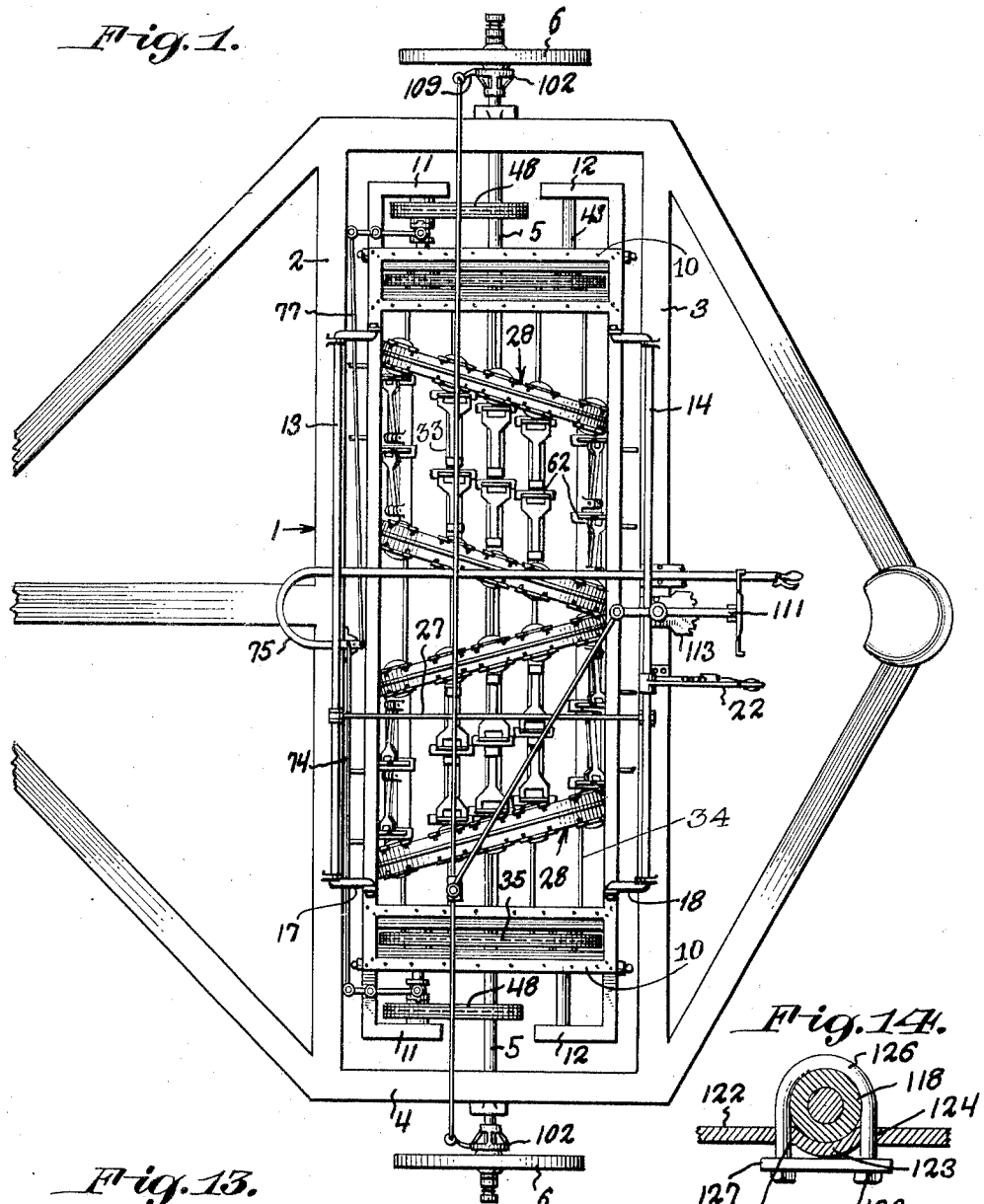
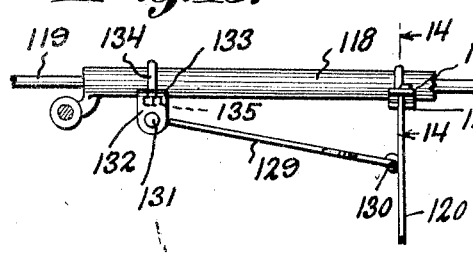
Inventor
Herman H. Boettcher
By Irving L. McCathran
Attorney

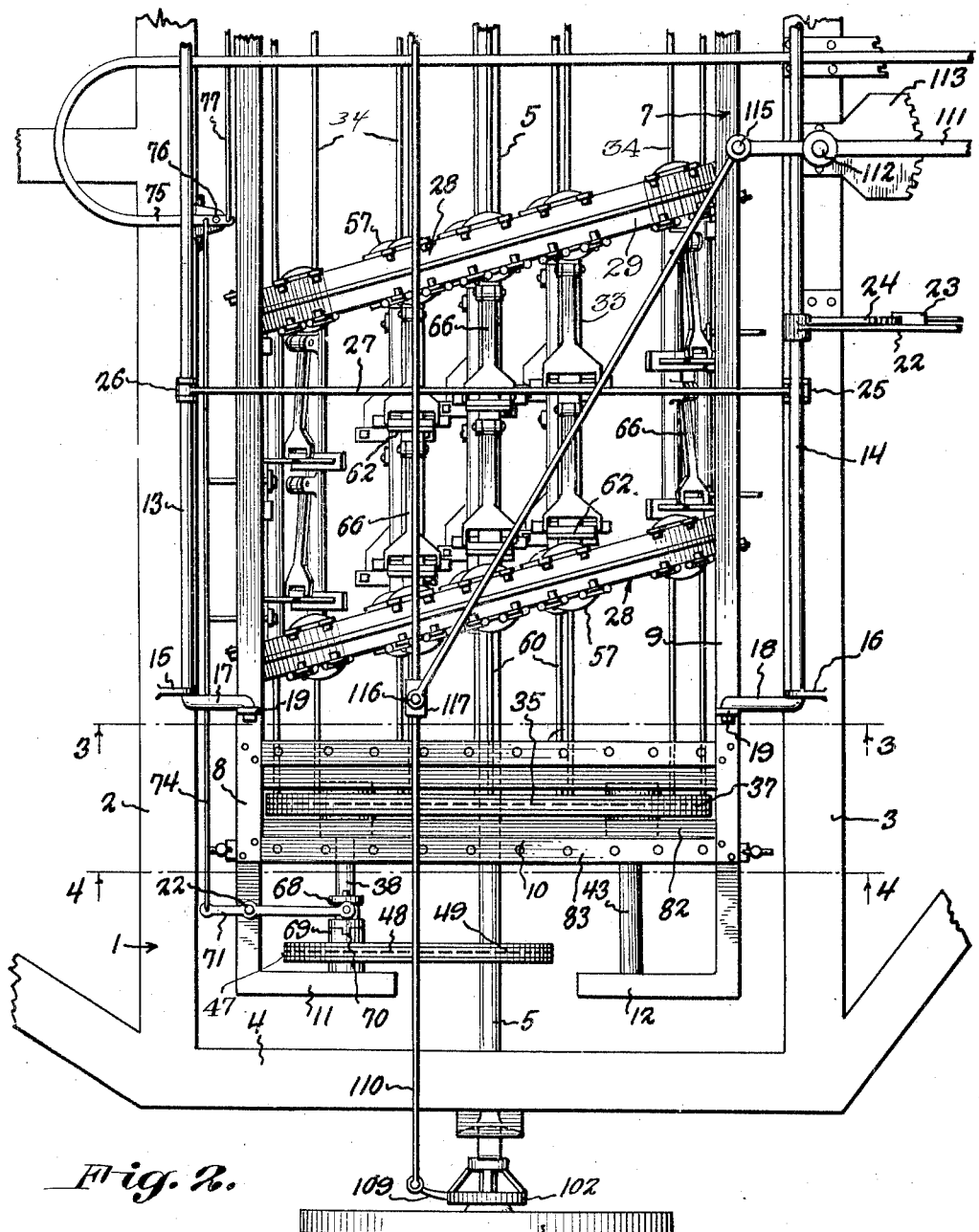

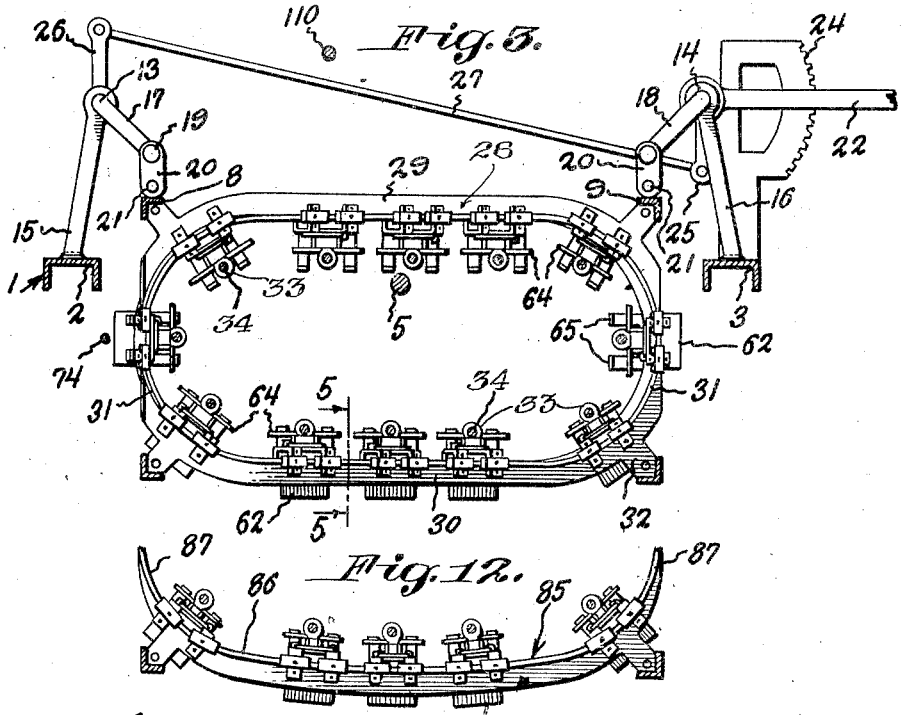
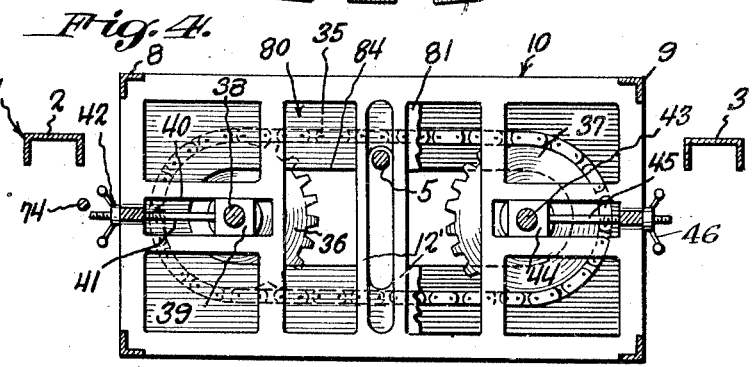
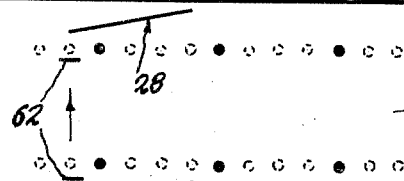
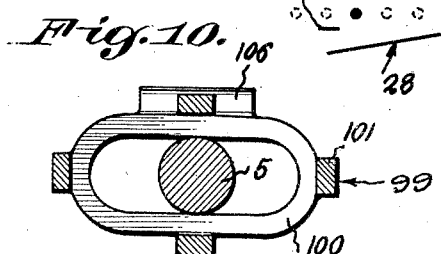

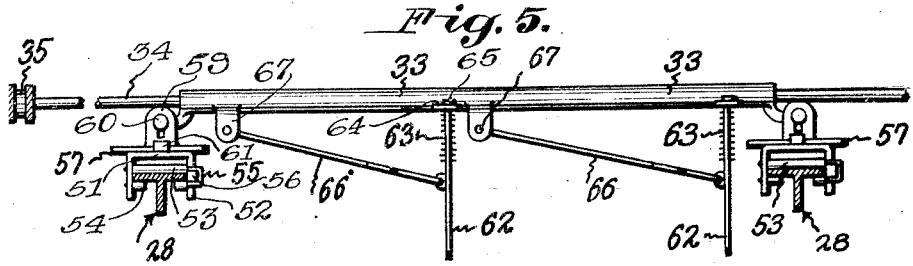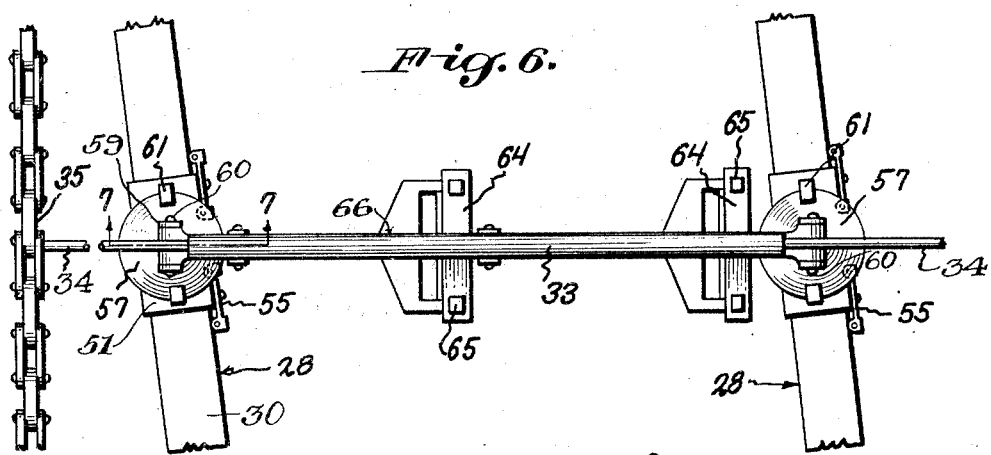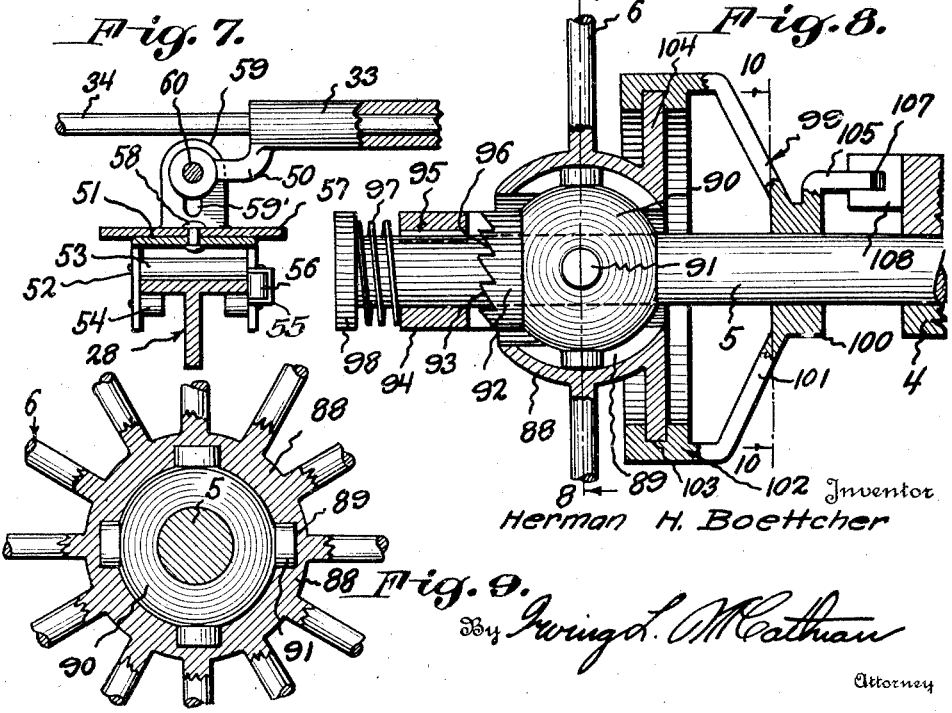

Patented Oct. 22, 1929

1,732,830

UNITED STATES PATENT OFFICE

HERMAN H. BOETTCHER, OF BLUE EARTH, MINNESOTA

BEET-THINNING MACHINE

Application filed February 7, 1928. Serial No. 252,608.

This invention relates to improvements in beet thinning machines and has as its general object to provide a machine which will overcome the disadvantages of machines heretofore employed for this purpose and which will further present many marked advantages over the ordinary machines.

The ordinary beet thinning machine is designed to operate in such manner that, when drawn along rows of beets, it will dig out and remove a number of plants in each row, leave standing a hill of plants in each row, and then cut out another corresponding number of plants in each row, but one of the disadvantages presented by machines heretofore employed for this purpose is that the digging blades are so constructed and operated that soil will be thrown from the row or furrow being operated upon, onto the plants in an adjacent furrow. Another disadvantage presented by machines heretofore employed for this purpose is that they will, in their operation, disturb the soil in the furrows to an undesirable extent. Therefore the present invention contemplates the provision of a beet thinning machine which will operate automatically to effectually remove successive numbers of plants at intervals in the furrows along which it is propelled without unduly disturbing the soil and without likelihood of casting the soil onto plants in adjacent furrows, the blades being so mounted and operated as to perform this function and leave standing, at suitable intervals, hills of the plants in the furrows.

It is a well known fact that many agricultural tasks may be performed more perfectly by hand than by machinery but that manual labor cannot be successfully employed as it is too slow and expensive, but in thinning beets, where the operation is performed manually by the use of an ordinary hoe, the disadvantages referred to above as attending the use of the ordinary thinning machine are overcome, inasmuch as the workman will draw his hoe across the furrows to remove the surplus plants and will perform this task with a steady movement of the hoe blade transversely of the furrows, without casting the soil onto plants in adjacent furrows. The present invention therefore has as a further important object to provide, in a machine of this class, an arrangement of blades and a means for effecting operation thereof which will, in the operation of the machine as it is drawn along the furrows, effect operation of the blades and action thereof upon the soil and the plants to be thinned out, in a manner very closely resembling the slow and tedious manual operation of a hoe, for this purpose, so that the invention contemplates a machine so constructed that the advantages of manual removal or thinning out of the surplus plants are obtained and automatically by a mechanical means which will operate at a greater rate of speed than can be effected by the manual hoeing of the furrows or rows and with greater accuracy and less expense.

Another object of the invention is to provide a machine of the class described possessing the advantages above outlined and which machine will be extremely simple in its construction and highly efficient in its operation.

Another object of the invention is to provide novel means for mounting the blades of the machine and the operating means therefor, so that the blades and the operating means may be suitably adjusted with respect to the furrows and the plants growing therein.

While the accompanying drawings and the description which is to follow, constitute a disclosure of the preferred embodiment of the invention, it will be understood that various changes may be made within the scope of what is claimed.

In the accompanying drawings:

Figure 1 is a top plan view of the machine embodying the invention;

Figure 2 is a similar view, on an enlarged scale, of one side of the machine;

Figure 3 is a vertical front to rear sectional view taken substantially on the line 3—3 of Figure 2 looking in the direction indicated by the arrows;

Figure 4 is a similar view on the line 4—4 of Figure 2 looking in the direction indicated by the arrow;

Figure 5 is a vertical sectional view taken substantially on the line 5—5 of Figure 3 looking in the direction indicated by the arrows and illustrating the arrangement of the blades and the means provided for operating the same;

Figure 6 is a plan view of the structure shown in Figure 5;

Figure 7 is a vertical transverse sectional view taken substantially on the line 7—7 of Figure 6 looking in the direction indicated by the arrows;

Figure 8 is a vertical sectional view illustrating the manner of mounting the ground wheels of the axle of the machine;

Figure 9 is a vertical transverse sectional view taken substantially on the line 9—9 of Figure 8 looking in the direction indicated by the arrows;

Figure 10 is a similar view on the line 10—10 of Figure 8 looking in the direction indicated by the arrows;

Figure 11 is a schematic view illustrating the manner in which the machine acts upon the plants in two rows or furrows;

Figure 12 is a fragmentary view similar to Figure 3 illustrating a modification of the invention;

Figure 13 is a view similar to Figure 5 illustrating a modification of the invention;

Figure 14 is a vertical transverse sectional view taken substantially on the line 14—14 of Figure 13.

The machine embodying the invention includes a frame structure 1 which may be drawn by draft animals or in any other desired manner and which includes a front sill 2, a rear sill 3, and end members 4 which connect the ends of the front and rear sills, the frame structure being mounted upon an axle 5 and the said axle being in turn supported by ground wheels 6 in the manner to be presently more specifically described. The frame structure 1 is preferably of the rectangular form shown in the drawings and may be of any desired construction, and the blade supporting and actuating means embodying the invention is mounted in an auxiliary frame which is supported for vertical adjustment within the main frame 1 in a manner which will now be described.

The auxiliary frame is indicated in general by the numeral 7 and the same comprises a front frame member 8, a rear frame member 9, a pair of frames 10 mounted between the frame members 8 and 9 near each end of the auxiliary frame, and end frame members 11 and 12 which extend toward each other from the front and rear frame members 8 and 9, respectively, and toward each other at opposite sides of the axle 5. The frame structure 7 preferably comprises pairs of the front and rear frame members 9 and their associated end portions 11 and 12, as illustrated in Figures 2 and 3 of the drawings, and the frames 10 are mounted at their corners in the angles of the frame members 8 and 9, these said members being preferably of the angle iron construction illustrated in Figures 2 and 3, each of the frames 10 being provided intermediate its ends with two parallel upright portions 12' between which the axle 5 extends, the supporting means for the frame structure 7 and the frames 10, being adapted to be operated so as to elevate and lower the said frame structure 7 and the frames 10, with respect to the ground surface. The supporting means for the frame structure 7 and the frames 10 supported therein is most clearly illustrated in Figures 2 and 3 of the drawings and comprises shafts 13 and 14 which are mounted for rocking movement in bearings 15 and 16 upon the front and rear frame members or sills 2 and 3 respectively, as best shown in Figure 2, the shafts 13 and 14 being formed with crank arms 17 and 18, at their ends, and these arms being pivotally connected as at 19 with the upper ends of links 20 which links are in turn connected at their lower ends as at 21, to the front and rear sills 8 and 9. It will be observed that the crank arms 17 and 18 extend from the shafts 13 and 14, in an inward direction toward each other at the respective ends of the shaft and manually operable means which will now be described, is provided for rotatably adjusting one of said shafts and for effecting a corresponding adjustment of the other shaft. The means referred to comprises a hand lever 22 which is fixed to the shaft 14 at a suitable point intermediate the ends of said shaft and which is provided with a hand operated pawl 23 which coacts with a segmental rack 24 mounted upon the rear sill 3 of the main frame 1. An arm 25 projects downwardly from the shaft 14, preferably adjacent the hand lever 22, and a similar arm 26 projects upwardly from the shaft 13, a connecting rod 27 being pivotally connected at its forward and rear ends to the lower end of the arm 25 and upper end of the arm 26, respectively. It will now be evident that by adjusting the hand lever 22, rocking motion will be imparted to the shaft 14 and, through the medium of the arms 25 and 26 and connecting rod 27, corresponding rocking motion will be imparted to the shaft 14, the rotation of the shafts 13 and 14 in one direction or the other serving to upwardly and downwardly swing the arms 17 and 18 to effect elevation or lowering of the frame structure 7.

In order that supporting means for the blades, to be presently specifically described, may be automatically caused to travel in a manner to effect proper actuation of the blades to dig or thin out, at successive intervals, in the rows of plants a predetermined number of the plants and leave correspondingly located plants in the two rows, standing, a pair of rails, indicated by the numeral 28, are arranged within the frame 7 near each end thereof. These rails 28 are of the angle iron construction illustrated most clearly in Figures 5 and 7 of the drawings and, as shown most clearly in Figure 3 of the drawings, each rail is endless, each rail including an upper portion 29, a lower portion 30, and arcuate end portions 31, the portions 29 and 30 extending parallel to each other and the arcuate portion 31 each describing substantially a half circle and joining the corresponding ends of the upper and lower portions 29 and 30. Suitable brackets 32 are secured to the outstanding flange of the rail and extend diagonally from the rail and are suitably secured to the front and rear frame members 8 and 9 as shown in Figure 3 of the drawings.

As illustrated in Figure 2 of the drawings and schematically in Figure 11, the rails of each pair are disposed in parallel planes with respect to each other and diagonally within the frame 7. The blades of each series, it being understood that an endless series of the blades is arranged at each side of the machine, are arranged in pairs and, as illustrated in Figures 6 and 7 of the drawings, each pair of blades is supported by a sleeve 33 which is slidably disposed upon a rod 34 which extends between and is supported by corresponding links of a pair of sprocket chains 35 which are trained over sprocket gears 36 and 37 located within the frames 10 at the respective side of the machine. The sprocket gear 36 is fixed upon a shaft 38 rotatably mounted in a bearing 39 supported in a slot 40 provided in the respective frame 10, a threaded stem 41 being extended from the bearing through the adjacent end of the frame 10 and an adjusting nut 42 being threaded onto the projecting end of the rod to provide for longitudinal adjustment of the rod for the purpose of adjusting the bearing 39 to tension the chain 35 and hold the same suitably taut. The sprocket 37 is mounted upon a similar shaft 43 journaled in a bearing 44 corresponding to the bearing 39 and provided with a stem 45 corresponding to the stem 41, a nut 46 corresponding to the nut 42 being threaded onto the stem 45 to bear against the respective end of the frame 10 for the purpose of adjusting the bearing 44 in order to, as stated, sufficiently tension the chain 35, to insure of travel of the chain about the sprocket gears 36 and 37. A sprocket gear 47 is mounted upon the shaft 38 and a sprocket chain 48 is trained about the gear 47 and about a sprocket gear 49 fixed upon the axle 5. In this manner motion is transmitted from the axle 5 to the sprocket chains 35 which are, as will be understood, located at opposite sides of the frame 1. A plurality of the rods 34 is employed and these rods are arranged in groups parallel to one another, the groups being relatively spaced throughout the length of the sprocket chains 35. As illustrated in Figures 5, 6 and 7 of the drawings, the rods 34 extend transversely of the pairs of rails 28, and in order that the sleeves 33 may be slidably moved, automatically, along the respective rods in the travel of the chains 35 about the sprocket gears 36 and 37, each sleeve is connected at its ends by a short extension 50, to slides which travel along and are guided by the rails 28. Each of these slides comprises a plate 51 provided with spaced parallel extensions 52 projecting at right angles from the plane of the plate and straddling the rail 28, an anti-friction roller 53 being mounted between the side portions 52 of each slide plate 51 and travelling in contact with the inner surface of the respective rail 28, and other anti-friction rollers indicated by the numeral 54 being rotatably mounted upon the inner sides of the spaced extensions 52 of each plate and travelling against the outer side of the respective rail 28. In order to compensate for any lateral thrust of the extensions 52 of the plates 51 against the side edges of the rail 28, brackets 55 are mounted upon one of the extensions 52 of each plate at the ends thereof and anti-friction rollers 56 are mounted in the ends of the brackets and have their peripheries presented in contact with the adjacent edge of the respective rail 28. Each slide further includes a plate 57 which is of the circular form illustrated in Figure 6 of the drawings and through which, and the plate 51, there is axially fitted a rivet or swivel pin 58 which serves to mount the plate 57 for swivelling movement upon the plate 51. The plate 57 is provided with spaced ears 59 having slots 59' which accommodate the ends of a pivot pin 60, and the extension 50 at the respective end of the respective sleeve 33 is disposed between the extensions 59 and pivotally engaged with the pin 60. In order to retain the plate 57 in flat engagement with the plate 51 and prevent any distortion of the said plate 57 and likewise in order to relieve the swivel pin 58 of strain, lugs 61 are struck up from the plate 51 at opposite ends of said plate and are arranged to marginally overlap the respective plate 57 at diametrically opposite sides thereof. At this point it will be understood that as travel is imparted to the sprocket chains 35, as the machine is drawn over the ground surface, the rods 34 will be caused to travel with the stretches of the chains 35, carrying with them the sleeves 33, and due to the connection of the ends of the sleeves with the slides 51, the said sleeves 33 will be longitudinally shifted as the said slides 51 are caused to travel over the lower stretch 30 of the rails 38, it being understood that the lower stretches of the chains 35 travel in a rearward direction, whereas the machine, as a whole, is travelling forwardly, in the operation thereof.

The blades which act in the manner of hoe blades and through the movement of which the beets are dug, are indicated by the numeral 62 and are provided with upwardly extending shanks 63 which are fitted through slots in brackets 64 which project beyond the forward and rear sides of the respective sleeve 33, the shanks 63 of the blades being overturned at their upper ends as at 65 whereby to be retained in said slots. Brace rods 66 are connected each at one end to a respective one of the blades 62 and at its other end to an ear 67 upon the under side of the sleeve 33. By reference to Figures 5 and 6 of the drawings, it will be observed that the blades 62 are supported in upright position beneath the sleeve 33 one near one end of the said sleeve and the other near the intermediate portion of the sleeve.

In practice the gearing which transmits motion from the axle 5 to the shafts 38 and 43 is so arranged as to impart travel to the chains 35, and consequently to the rods 34 and the sleeves 33 and finally to the blades 62, at a rate of speed equal substantially to the speed of travel of the machine over the field and the gearing is likewise arranged, as will be evident by reference to the drawings, so as to cause travel of the chains 35 in such direction that their lower stretches, which are next adjacent the ground surface, will travel rearwardly. As a consequence the rods 34 are relatively stationary with respect to the ground surface. Inasmuch as the connections for the ends of the sleeves 33 are travelling along the endless rails, in the direction stated above and the rails are, as stated, disposed diagonally within the frame structure 7, lateral travel will be imparted to the blades due to the longitudinal sliding of the sleeves 33 along the respective rods 34. Therefore, as the machine is propelled over the field and the blades are presented to the ground surface, they will be caused to travel directly laterally without however advancing over the ground surface in the direction of travel of the machine due to the transmission of motion to the chains which support the rods and sleeves which in turn support the blades, at a speed equal to the speed of travel of the machine. Therefore the blades will, in their said lateral movement, enter the soil and remove or thin out such of the beet plants as are in their path of movement. As will be observed by reference to Figure 3 and likewise by reference to the schematic illustration of Figure 11, the rods and sleeves supporting the blades are arranged in a plurality of series and the endmost blades of the relatively adjacent series are spaced apart a relatively short distance, the arrangement being such that the spacing of these particular blades is slightly greater than the space occupied by the growing beet plants of a hill or group which are not to be disturbed in the thinning out operation. As a consequence, as the machine travels over the surface of the field and along the furrows with each pair of the rails straddling two of the furrows, the blades will be operated in a manner to dig up and remove a number of the growing plants, then skip one or a group of the plants, and again dig up and remove another number of the growing plants, so that, as the machine passes along the furrows, plants will be left standing as illustrated by full line circles in Figure 11, the broken line circles indicating plants which have been removed.

It will therefore be evident, from the foregoing, that, in the operation of the machine embodying the invention, beets are thinned in an expeditious and accurate manner and without the likelihood of casting the soil onto adjacent rows of growing beet plants. It will furthermore be evident that the blades of the machine are operated in a manner precisely the same as that in which the blade of a hoe would be manipulated in the manual thinning out of beet plants so that the invention avoids all of the disadvantages of the ordinary types of machines for this purpose and at the same time obtains all of the advantages of careful manual thinning of the plants.

It will be evident that by mounting the sleeves 33, at their ends, upon the plates 57 which are swiveled upon the slides 51, provision is made for the smooth and even travel of the slides about the curvilinear ends 31 of the endless rails.

It is of course desirable that means be provided whereby the transmission of power from the axle 5 to the shaft 38 may be interrupted in order to discontinue the operation of the machine when the same is making a turn at the ends of a field or is being driven from one part of a field to another, and this means, as illustrated in Figure 2 of the drawings, comprises a clutch collar 68 which is keyed slidably upon each shaft 38 and is provided with the usual teeth 69 to engage in recesses 70 in the adjacent end of the hub of the gear 47, a lever arm 71 being pivotally mounted as at 72 upon the frame member 8 and provided at one end with a yoke 73 which engages in the usual groove provided in the clutch collar 68. A rod 74 is connected at one end to the forward end of the lever 71 and therefore at the opposite side of the pivot 72 from that at which the yoke 73 is located, and the other end of this rod is connected to an operating hand lever 75, at one side of the pivot 76 for said lever, the corresponding rods 77 leading from the lever for the other clutch at the opposite side of the machine being connected to said lever 75 at the other side of the pivot 76. A pawl device 78 upon the lever 74 coacts with a segmental rack 79 upon the frame member 2, and it will now be understood that by adjusting the lever 75, the clutch collars 68 may be adjusted so as to clutch the gears 47 with the shaft 38 or unclutch the gears and permit free rotation thereof upon the shafts.

Inasmuch as there is a longitudinal thrust imposed upon the rods 60 as the blades move transversely of the furrows and through the soil, and as it is desirable to prevent disengagement of the sprocket chain 35 from the gears 36 and 37, under these conditions, a guard, indicated by the numeral 80 is mounted upon that one of the frames 10 which is located at one side of the sprocket chain 35 and the gears 36 and 37, this guard comprising a sheet metal plate 81 which is of rectangular marginal contour and of substantially the same dimensions as the said frame structure 10 and which is provided with a marginal flange 82 which is disposed within the flange of the angle iron frame 10 and secured in place by rivets or other suitable fastening elements 83, this plate having its central portion cut away, as indicated by the numeral 84 so as to accommodate the shafts 38 and 43 upon which the gears 36 and 37 are mounted, and also the bearings 39 and 44 for said shafts, the said plate 81 being positioned in a vertical plane relatively close to the adjacent sides of the stretches of the sprocket chain 35 as clearly shown in Figure 2 of the drawings.

Figure 12 of the drawings illustrates a slight modification in the form of the rails 28 and in this figure the rail, which is indicated by the numeral 85, includes the usual upper stretch which is not shown, and the bottom stretch which is indicated by the numeral 86, the rail likewise including the arcuate end portions 87 which correspond to the portions 31 of the rail previously described. In this embodiment of the invention the lower stretch 86 of the rail is preferably slightly downwardly curved from the two end portions 87, so that the blades are caused to gradually enter the soil and gradually leave the same and are arranged in gradually arcuate series at the time they are moved transversely across the furrows.

In order that the machine may be steered, means, which will now be described, is provided for mounting the wheels upon the axle 5 for angular adjustment and for so adjusting said wheels. Each wheel is provided with a hub 88 which is of substantially hollow spherical form and which is provided, interiorly, with arcuate grooves 89 extending between the opposite open sides of the hub and circumferentially thereof, the said grooves being equi-distantly spaced as clearly shown in Figure 9 of the drawings. A spherical head 90 is fitted on to each end of the axle 5 and is accommodated within the respective wheel hub 88, and the heads 90 are formed with studs 91 which are arranged in a circumferential series about the heads and which project each into a respective one of the grooves 89. The head 90 is provided at its laterally outwardly presented side with a collar extension 92 which is provided, at its outwardly presented side, with rack teeth 93, and a collar 94 is fitted onto the end portion of the axle 5 which projects beyond the collar portion 92 of each head 91 and is slidable upon said shaft but connected with the shaft for rotation therewith through the medium of a key 95, the collar being provided with ratchet teeth 96 which coact with the teeth 93 and being held in coactive relation to the collar portion 92 through the medium of a compression spring 97 which is arranged upon the said end of the axle and bears between the collar 94 and a head 98 which is suitably fixed upon the extreme end of the axle. By reason of this construction, the heads 90 are connected for rotation with the respective ends of the axle 5 and consequently the wheels 6 are connected for rotation with the axle. However due to the provision of the toothed collar portion 92 upon each head 90 and the provision of the collar 94 which is keyed to the shaft and provided with the teeth 96 which are normally held in coactive engagement with the teeth 93, through the medium of the spring 97, in making turns at the ends of furrows, the wheel at the inside of the curve may remain stationary or even revolve backwardly with relation to the wheel at the outer side of the curve due to a slippage of the teeth 96 of the collar 94, of the inner wheel, past the teeth 93 of the collar portion 92 at the respective end of the axle. The numeral 99 indicates a spider including a yoke 100 which is fitted upon the axle 5 at a point inwardly of the head 90, and arms 101 which radiate from the yoke and are inclined laterally outwardly and support a rim 102 which is provided in its inner surface with a groove 103. The hub 88 is formed at its inner side with an annular disk-like head 104 the periphery of which is seated in the groove 103 and is rotatable therein. The spider 99 is provided upon its yoke 100 with a lug 106 which is flat sided and projects laterally inwardly from the upper side of the collar parallel to the axis of the axle 5 and works in a longitudinal channel 107 formed in a head 108 which is fixed in any suitable manner upon the respective side manner 4 of the main frame 1 of the machine, it being understood that, in the angular adjustment of the wheels, the spider 99 will be angularly displaced, with the wheel, due to the fitting of the periphery of the head 104 in the groove 103 in the rim 102 of the spider. In order that the spiders 99 may be angularly adjusted so as to effect a corresponding adjustment of the respective wheels 6, each spider is provided preferably upon the forward side of its rim 102 with an arm 109, and a rod 110 is pivotally connected at its ends to the ends of the arms 109 of the spiders for the two wheels and extends between these arms. A foot lever 111, which is pivotally mounted as at 112 upon the front sill 2 of the main frame of the machine, is adapted to be angularly adjusted by the feet of the operator of the machine and the lever is held in different positions of angular adjustment through any suitable pawl device upon said lever (not shown) which coacts with a segmental rack 113. A rod 114 is pivotally connected as at 115 to the rear end of the lever 111 and likewise pivotally connected as at 116 to a sleeve 117 which is fixed upon the rod 110 and at this point it will be evident that by angularly adjusting the lever 111, the rod 110 will be adjusted longitudinally so as to effect angular adjustment of the wheels 6 to suitably steer the machine, the yokes 100 of the spiders 99 which are associated with the wheels, moving in an arcuate direction over the respective ends of the axle 5.

Figures 13 and 14 of the drawings illustrate a modification of the blade supporting means and in these figures the sleeve, which corresponds to the sleeve 33 of the previously described embodiment, is indicated by the numeral 118 and the rod upon which the sleeve is mounted being indicated by the numeral 119. In this embodiment the blade, which is indicated by the numeral 120, is provided with shank portions 121, at its upper end, as in the case of the blade of the previously described embodiment, and these shank portions are fitted upwardly through slots in a bracket plate 122 which is, in this embodiment, formed separate from the sleeve 118 and is provided, intermediate its ends, with a depressed portion 123 formed to embrace the under side of the sleeve 118 against which it is disposed, as shown in Figure 14 of the drawings, the bracket plate 122 being formed at opposite sides of the depression 123 with openings 124 through which are fitted the arms 125 of a U-bolt 126 which is disposed to straddle the upper side of the sleeve, a plate 127 being fitted to the lower ends of the arms of the U-bolt and engaging the under side of the depressed portion 123, and nuts 128 being threaded onto the ends of the arms of the bolt and tightened to bear against the said plate 127. In this manner the bracket member 122 is adjustably mounted upon the sleeve 118. The numeral 129 indicates a brace rod which is pivotally connected at one end as at 130 to the plate 127 in the manner described in connection with the first embodiment of the invention, and the other end of this rod is pivotally mounted as at 131 between a pair of ears 132 provided upon the under side of a plate 133 which is clamped to the under side of the sleeve 118 by a U-bolt 134 which is disposed to straddle the upper side of said sleeve, nuts 135 being threaded onto the lower ends of the arms of the U-bolt and tightened to bear against the plate 133 whereby to hold the plate in positions of adjustment upon the sleeve 118. In connection with this embodiment of the invention it will be understood that by loosening the nuts 128 and 135, the bracket 122 and the plate 133 may be slidably adjusted along the sleeve 118 so as to provide for any desired longitudinal adjustment of the blade 120 along the sleeve 118.

Having thus described the invention, what I claim is:

1. In a machine of the class described, spaced endless rails disposed parallel to each other and at an angle to the line of travel of the machine, endless elements mounted for travel at opposite sides of the said rails, means for imparting motion to said elements, the said elements being arranged in planes parallel to the line of travel of the machine, rods extending between said elements, supporting members upon the rods, blades supported by said members, and means carried by the supporting members and slidably engaging the rails for effecting sliding movement of said members on said rods.

2. In a machine of the class described, a frame supported for travel, spaced parallel endless rails supported by said frame and extending at an angle to the line of travel of the machine, endless gear elements arranged at opposite sides of the rails, means for imparting travel to said gear elements, the gear elements traveling in planes substantially parallel to the line of travel of the machine, rods extending between said gear elements in an endless series and transversely of the rails, slides slidably mounted upon the rails, sleeves mounted slidably upon the rods, operative connection between the sleeves and slides for effecting travel of the sleeves between the rails and at a rate of speed, at the lower stretch of the endless series of sleeves, equal substantially to the speed of travel of the machine and in a direction the opposite to the direction of travel of the machine, and blades carried by said sleeves, the connection of the sleeves with the rails and the angular disposition of the rails with respect to the line of travel of the machine effecting lateral movement of the sleeves and blades carried thereby in the travel of the sleeves and blades.

3. A machine of the class described comprising a frame supported for travel, spaced endless rails mounted upon the frame and including upper and lower portions and arcuate connecting portions, the said rails occupying planes parallel to each other and at an angle to the line of travel of the machine, an endless series of rods supported for travel in unison and in position transverse to the rails, means for imparting travel to the series of rods, supporting means slidably mounted upon the rods intermediate the rails, blades mounted upon the supporting means, and operative connection between the supporting means and the rails for effecting automatic sliding movement of the supporting means along said rods in the travel of the rods about the said rails, the motion transmitting means operating to impart travel to the lower stretch of the series of rods in a direction the reverse of the direction of travel of the machine and at a rate of speed equal substantially to the rate of speed of travel of the machine, the connection between the supporting members and the rails constituting means for effecting lateral movement of the blades transverse to the line of travel of the machine.

4. In a machine of the class described, a frame supported for travel, endless rails mounted in the frame and disposed in vertical parallel planes at an angle to the line of travel of the machine, endless elements supported for travel at the opposite sides of the rails, rods extending between said elements and transversely with respect to the rails, means for imparting motion to said elements to effect travel of the rods, supporting elements slidably mounted upon the rods, slides each including a member slidably mounted upon a respective one of the rails and a member swiveled thereto, operative connection between the second mentioned members of the slides and the sleeves, and blades carried by the sleeves.

5. In a machine of the class described, a frame supported for travel, endless rails mounted in the frame in planes parallel to each other and at an angle to the line of travel of the machine, pairs of sprocket gears arranged at opposite sides of said rails, a sprocket chain trained about the gears of each pair, means for imparting rotary motion to the corresponding gear of each pair, rods carried by the chains and extending between the same and transversely with respect to the rails, sleeves slidably mounted upon said rods intermediate the rails, slides associated with the rails and each comprising a member having a plate portion and side portions extending at opposite sides of the respective rails, anti-friction rollers journaled between the side portions and in contact with the rail, other rollers mounted upon the inner sides of the side portions and overhanging and contacting the flanges of the respective rails, a plate member swiveled upon the plate portion of the first mentioned member of each slide, operative connection between the last mentioned plate member and the ends of corresponding ones of the sleeves, and blades carried by the sleeves.

6. In a machine of the class described, a frame supported for travel, endless rails mounted in the frame in planes parallel to each other and at an angle to the line of travel of the machine, pairs of sprocket gears arranged at opposite sides of said rails, a sprocket chain trained about the gears of each pair, means for imparting rotary motion to the corrsponding gear of each pair, rods carried by the chains and extending between the same and transversely with respect to the rails, sleeves slidably mounted upon said rods intermediate the rails, slides associated with the rails and each comprising a member having a plate portion and side portions extending at opposite sides of the respective rails, anti-friction rollers journaled between the side portions and in contact with the rail, other rollers mounted upon the inner sides of the side portions and overhanging and contacting the flanges of the respective rails, a plate member swiveled upon the plate portion of the first mentioned member of each slide, operative connection between the last mentioned plate member and the ends of corresponding ones of the sleeves, other anti-friction rollers carried by one of the side members of each slide and contacting the margin of the respective flange of the associated rail, and blades carried by the sleeves.

7. In a machine of the class described, a frame supported for travel, rails mounted in the frame parallel to each other and at an angle to the line of travel of the machine, the said rails being endless and including upper and lower lengths and curvilinear end portions connecting the upper and lower lengths, the supporting means for the frame including an axle, shafts mounted in the frame, a sprocket upon one of the shafts, a sprocket upon the axle, a sprocket chain trained about the said sprockets, means upon the said shaft operable to clutch the first mentioned sprocket with the said shaft, a sprocket mounted upon the said shaft, a shaft mounted in the frame parallel to the first mentioned shaft, a sprocket thereon, a sprocket chain trained about the last mentioned sprocket, rods extending from the chain and transversely with respect to the rails and arranged in a series and movable through travel of the chain, supporting members slidably mounted upon the rods, blades mounted upon the supporting members, and means connected with the supporting members and slidably engaging the rails for effecting lateral movement of the supporting members and the blades carried thereby in the travel of the rods with respect to the rails.

8. In a machine of the class described, a frame supported for travel, spaced endless rails disposed in vertical planes parallel to each other, within said frame, the rails being disposed at an angle to the line of travel of the machine, a series of rods, means connecting the rods and operating to effect travel thereof beside said rails, a sleeve mounted upon each rod for sliding movement, slides slidably mounted upon the rails and operatively connected with the ends of each respective sleeve, blades supported by each sleeve and one located near one end of the respective sleeve and the other near an intermediate point of said sleeve, and braces extending between said blades and the sleeves.

9. In a machine of the class described, a main frame, a wheeled axle supporting the main frame, a frame arranged within the main frame, blades mounted in the second mentioned frame, means operated from the axle for imparting travel to said blades in a direction the opposite to the direction of travel of the machine and at substantially the same rate of speed as the speed of travel of the machine, and for imparting motion to the blades transverse to the line of travel of the machine, and means for vertically adjusting the second mentioned frame within the main frame to vary the position of the blades with respect to the ground surface, the said means comprising rock shafts mounted upon the main frame at opposite sides of the second mentioned frame, crank arms extending from the ends of said shafts, link connections between the crank arms and the second mentioned frame, operative connection between the shafts for effecting simultaneous rocking movement of the shafts in opposite directions, and means connected with one of the shafts operable to rock the same.

10. In running gear, an axle, a wheel having a hub, the hub being formed to provide one member of a universal joint, a companion member of said joint upon said axle, means operatively connected with the hub of the wheel and operable to angularly adjust the wheel with respect to the axle, the member upon the axle having a portion constituting one member of a clutch, and a companion member of said clutch rotatable with the axle and mounted thereon, and means for yieldably holding said member of the clutch in engagement with the portion of the universal joint member constituting the first mentioned member of said clutch.

11. Running gear comprising an axle, a wheel having a substantially spherical hollow hub provided at intervals in its circumference with transverse grooves, a head upon the axle seated in the hub and having radial studs engaging in said grooves, a disk-like head upon the hub at one side thereof in axial alinement with the axle, a spider comprising a yoke fitting the axle and angularly adjustable with respect to the same, arms extending from the collar, a ring supported by the arms and fitting the said circular head and rotatably accommodating the periphery thereof, and means connected with the ring of the spider for angularly adjusting the spider with respect to the axle to effect corresponding adjustment of the wheels.

12. Running gear comprising an axle, a wheel having a substantially spherical hollow hub provided at intervals in its circumference with transverse grooves, a head upon the axle seated in the hub and having radial studs engaging in said grooves, a disk-like head upon the hub at one side thereof in axial alinement with the axle, a spider comprising a yoke fitting the axle and angularly adjustable with respect to the same, arms extending from the collar, a ring supported by the arms and fitting the said circular head and rotatably accommodating the periphery thereof, means connected with the ring of the spider for angularly adjusting the spider with respect to the axle to effect corresponding adjustment of the wheels, a fixed member having a longitudinal seat therein, and a lug upon the said collar of the spider projecting in slidable engagement with the said seat.

In testimony whereof I affix my signature.

HERMAN H. BOETTCHER.